March 20, 1951 B. B. BOWREN 2,545,443
INTERNAL GROOVING AND REAMING TOOL
Filed Feb. 23, 1949 2 Sheets-Sheet 1
FIG. 1.
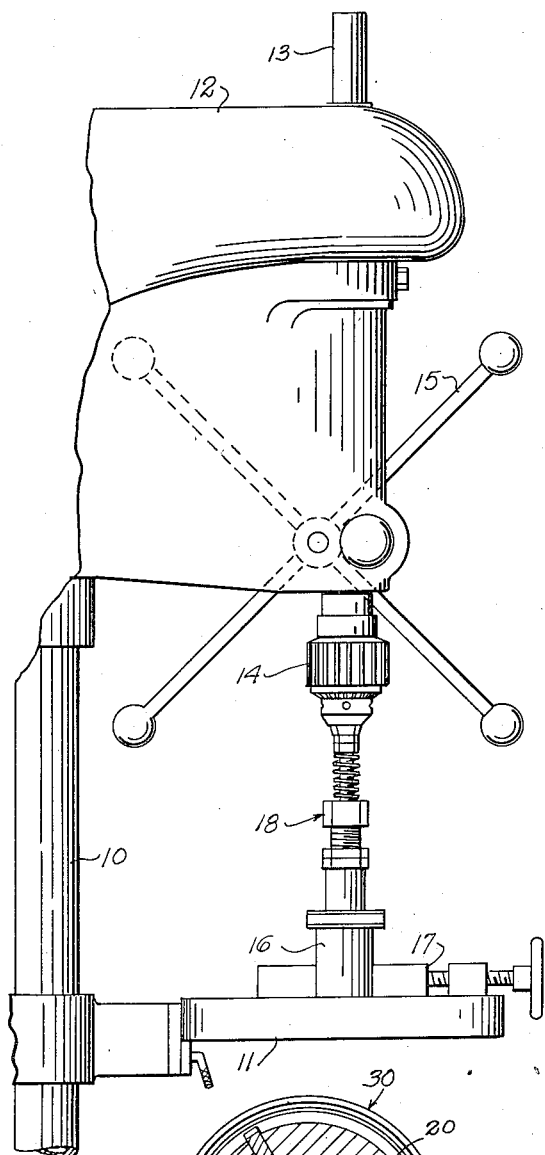
FIG. 2.
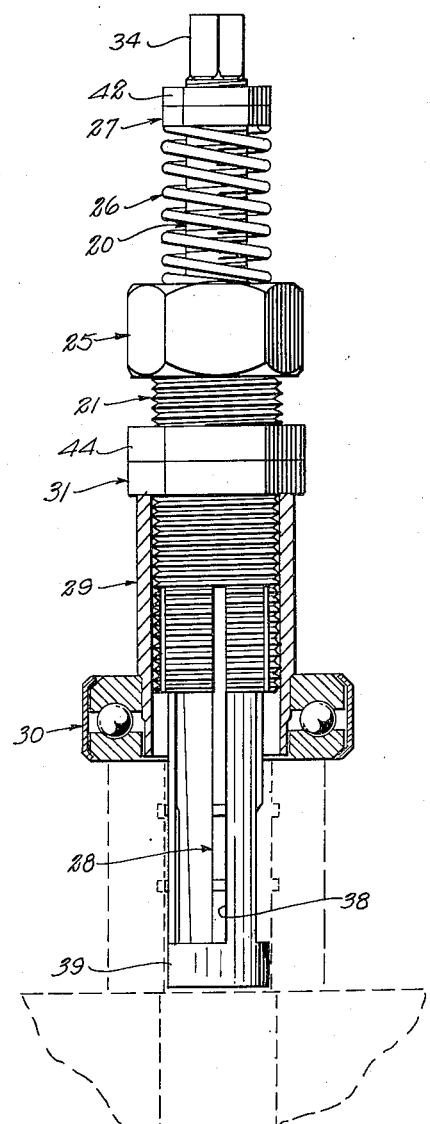
FIG. 7.
INVENTOR.
BURL B. BOWREN,
BY
McMorrow, Berman & Davidson
ATTORNEYS.

March 20, 1951     B. B. BOWREN     2,545,443
INTERNAL GROOVING AND REAMING TOOL
Filed Feb. 23, 1949     2 Sheets-Sheet 2
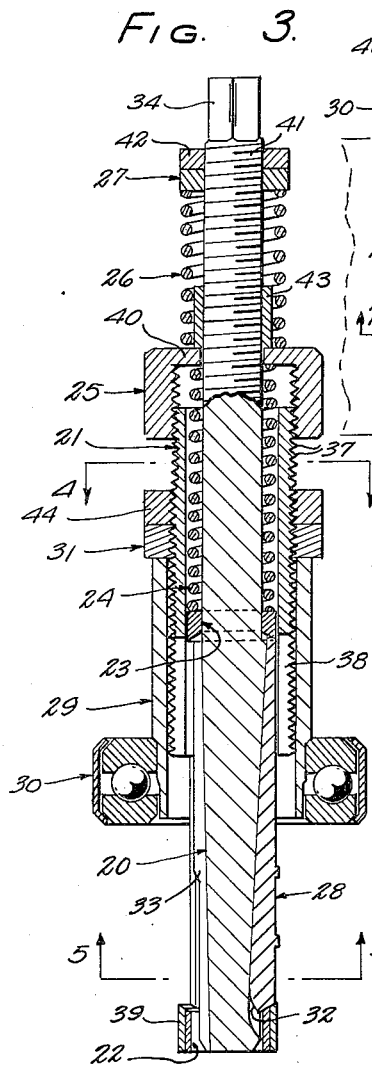
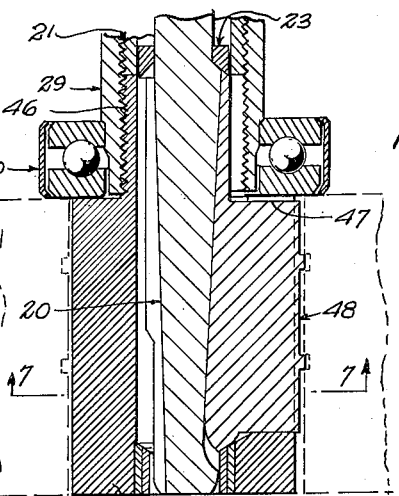
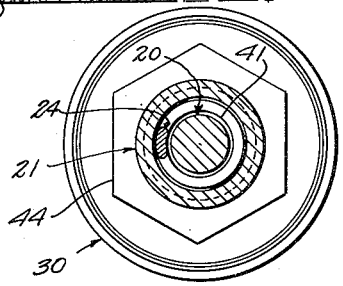
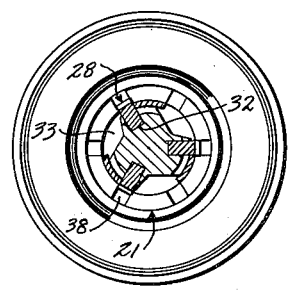
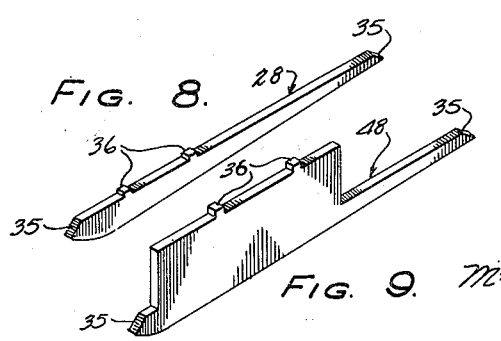
INVENTOR.
BURL B. BOWREN,
BY McMorrow, Berman + Davidson
ATTORNEYS.

Patented Mar. 20, 1951

2,545,443

UNITED STATES PATENT OFFICE 2,545,443

INTERNAL GROOVING AND REAMING TOOL

Burl B. Bowren, Freeport, Tex.

Application February 23, 1949, Serial No. 77,949

5 Claims. (Cl. 77—58)

This invention relates to grooving and reaming tools, and more particularly to an expansible tool for grooving and reaming the walls of holes or bores in work pieces such, for example, as the walls of the tube-receiving holes in a boiler or condenser tube sheet.

It is among the objects of the invention to provide an improved, expansible tool particularly adapted for power operation, which is fully self-centering in operation, is capable of performing several operations, such as reaming, countersinking and grooving, simultaneously, is fully adjustable for different sizes and depths of bores or holes, is readily convertible to different purposes by the mere substitution of cutting blades of different shapes or sizes, can be easily converted for use in holes or bores having diameters in different dimensional ranges by the application of suitable adapters thereto, and which is simple and durable in construction, economical to manufacture, and can be successfully used by any mechanic capable of using a power-operated drill press or a portable electric drill.

Other objects and advantages will become apparent from a consideration of the following description and the appended claims in conjunction with the accompanying drawings, wherein:

Figure 1 is a side elevation of a fragmentary portion of a power-operated drill press showing an expansible tool illustrative of the invention operatively mounted in the drill press;

Figure 2 is a longitudinal elevation of the expansible tool, a portion being broken away and shown in longitudinal cross-section to better illustrate the construction of the tool;

Figure 3 is a longitudinal, medial cross-section of the tool on a somewhat reduced scale;

Figure 4 is a transverse cross-section on the line 4—4 of Figure 3;

Figure 5 is a transverse cross-section on the line 5—5 of Figure 3;

Figure 6 is a longitudinal, medial cross-section of a tool adapter, a fragmentary portion of the tool connected to the adapter also being shown in longitudinal, medial cross-section;

Figure 7 is a transverse cross-section on the line 7—7 of Figure 6;

Figure 8 is a perspective view of one form of cutting blade usable in the expansible tool; and Figure 9 is a perspective view of a cutting blade usable with the adapter illustrated in Figure 6.

With continued reference to the drawings, and particularly to Figure 1, the tool is shown operatively mounted in a power-operated drill press, but it is to be understood that the tool is usable with equal facility in a portable electric drill or air drill or in a lathe.

The conventional drill press illustrated, has a standard 10 which carries the table 11 and the head 12 above the table. The drill spindle 13 extends vertically through the head at a location spaced from the standard 10 and has secured on its lower end the drill chuck 14. The spindle is rotatable by suitable driving means, such as an electric motor, drivingly connected thereto, and is vertically movable by a hand-wheel 15 to raise and lower the chuck 14. As the drill press may be entirely conventional in construction, a further description is not considered necessary for the purposes of the present disclosure. In the illustration, a work piece 16 having a hole or bore therethrough is supported on the table 11 and held in position on the table by a suitable table-carried vise 17, in a manner well-known to the art, and the expansible tool of the present invention, as generally indicated at 18, is secured at its upper end to the drill chuck 14, and operates in the interior of the work piece 16 held on the drill table 11. While the work piece has been illustrated as a cylindrical bushing, it is to be understood that the tool is operative with various kinds of work pieces, such as boiler and condenser tube sheets, flange plates, et cetera.

The improved expansible tool comprises, in general, an elongated, generally cylindrical core 20, a hollow, cylindrical housing 21 receiving the core, a bushing 22 secured in one end of the housing 21, a second bushing 23 surrounding the core within the housing at a location spaced from the bushing 22, a compression spring 24 surrounding the core within the housing 21 and bearing at one end on the bushing 23, a flanged abutment nut 25 threaded onto one end of the housing and bearing on the end of spring 24 opposite bushing 23, a second compression spring 26 surrounding the core and bearing upon the flanged nut 25 opposite the spring 24, abutment nuts 27 threaded onto the core and bearing on the end of spring 26 opposite the flanged nut 25, blades 28 carried by the core, a sleeve 29 receiving the housing 21, an anti-friction thrust bearing 30 on one end of the sleeve, and abutment nuts 31 threaded onto the housing 21 and bearing against the end of sleeve 29 opposite the thrust bearing 30.

The core 20 is provided with three elongated grooves 32, spaced apart at equal angular intervals of substantially 120-degrees around the core and extending longitudinally from one end of the core to a location intermediate the length of the latter, each of these grooves having parallel side edges and a bottom surface which inclines slightly outwardly of said core in a direction away from said one end, and longitudinally-extending recesses 33 are provided in the core respectively adjacent the grooves 32 for receiving cuttings from the blades 28 carried respectively in the grooves. At its opposite end the core is provided with a squared or non-circular shank 34 which is receivable in a drill or lathe chuck to rotate the tool and apply longitudinal pressure to the core for a purpose which will presently appear.

Each of the blades 28 comprises a flat member of hard steel of a width to slidably fit in the grooves 32 of the core, and tapered in thickness from one end to the other. The ends of the blade are oppositely beveled, as indicated at 35, and the tools are disposed in the core slots with their thicker ends adjacent the ends of the slots at the corresponding end of the core. The edges of the blades extending out of the core slots are suitably shaped and ground to provide the desired cutting operation. The blade illustrated in Figure 8 has a straight cutting edge designed to ream and slightly counter-sink the wall of a tube-receiving hole in a tube sheet, and has two teeth or extensions 36 projecting outwardly from this cutting edge to cut two spaced-apart grooves into the wall of the tube-sheet hole.

The bushing 23 is internally chamfered and engages the beveled ends of the blades at the thinner ends of the latter, and the bushing 22 is also internally chamfered and engages the beveled blade ends at the thicker ends of the blades.

The housing 21 comprises a hollow, cylindrical portion provided with external screw threads 37, and a portion of reduced external diameter extending longitudinally from one end of the screw-threaded portion. The portion of reduced diameter is provided with angularly-spaced-apart, longitudinally-extending slots 38 which register respectively with the slots and recesses in the core 20, and has at its end opposite the screw-threaded portion a continuous ring or band 39 in which the bushing 22 is secured. The housing portion of reduced diameter has a length somewhat less than the length of the blades 28, but the slots 38 are extended into the screw-threaded portion of the housing, so that the slots have a length substantially equal to the length of the blades.

With this construction, when the housing 21 is moved longitudinally relative to the core 20 in a direction away from the end of the core to which the slots 32 and recesses 33 extend, the blades 28 are moved longitudinally in the respective grooves 32 by the bushing 22 and are forced radially outwardly of the core by reason of the inclined bottom surfaces of the grooves and the tapered thickness of the blades. The chamfered ends of the bushings 22 and 23 engaging the beveled ends of the blades and the pressure of spring 24 on bushing 23 maintain the blades in operative assembly with the core and against accidental separation therefrom.

The core is moved longitudinally of the housing in a direction to expand the blades 28 by pressure exerted by the drill chuck on the shank 34, and movement of the housing in the same direction is resisted by the tool-stop bearing 30. The core is resiliently urged inwardly of the housing in a tool-retracting direction by the springs 24 and 26 and the associated abutment nuts 27.

The flanged nut 25 threaded upon the end of the screw-threaded portion of the housing opposite the reduced housing portion is provided with an internal flange 40 which bears on the end of compression spring 24 opposite that end of the spring which bears on the bushing 23, so that the spring applies a resilient force to the bushing to maintain the bushing in operative engagement with the thinner ends of the blades 28. The spring 26 surrounds a portion of the core provided with external screw threads 41 and bears at one end on the side of the abutment nut 25 opposite the spring 24. The abutment nut 27 is threaded onto the screw-threaded portion of the core and bears upon the end of spring 26 opposite nut 25 and is preferably held in adjusted position on the core by a lock nut 42. A centering or spacing sleeve 43 surrounds the core within the spring 26 adjacent the nut 25. The spring 26 thus tends to move the core inwardly of the housing in a blade-retracting direction and is preferably somewhat stronger than the spring 24.

The outer sleeve 29 may either slidably receive the screw-threaded portion of the housing, or may be provided with internal screw threads and threaded onto the housing. This sleeve is secured in adjusted position lengthwise of the housing by the abutment nut 31, and where the sleeve is slidable relative to the housing, this abutment nut is locked in adjusted position by a suitable lock nut 44. The anti-friction thrust bearing 30 secured on the end of the sleeve 29 nearest the end of the core to which the blade-receiving slots extend, rests upon the surface of the work piece surrounding the hole or bore in which the blades 28 operate, and serves as a depth stop for the tool, resisting movement of the housing when pressure is applied to the tool shank 34 and thus forcing the core to move longitudinally of the housing against the force of spring 26.

The tool-expanding movement of the core relative to the housing is terminated when the spring 26 is compressed to a solid condition. By adjusting the abutment nut 27 along the screw-threaded portion of the core, the movement of the core relative to the housing can be varied and the expansion of the cutting blades thus regulated.

The amount of blade expansion of the tool has practical limits, and it is thus possible to use the tool as above-described for reaming and grooving holes within a particular range of diametrical dimensions. The tool may be readily adapted, however, for operation in holes or bores of larger ranges of diametrical dimensions by applying suitable adapters to the tool.

A suitable adapter for increasing the range of operation of the tool is illustrated in Figures 6 and 7, and comprises a cylindrical body 45 which can be applied as an extension to the housing 21.

The cylindrical body 45 has a cylindrical, concentric bore extending longitudinally therethrough of the same size as the interior of the housing 21. The band 39 at the outer end of the reduced portion of the housing is received with a close fit in one end of the bore of the cylindrical body 45, and this body has on its opposite end a concentric, externally screw-threaded extension 46 having the same external diameter as the external diameter of the screw-threaded portion of the housing 21. The sleeve 29 is internally screw threaded and is threaded onto the housing 21 so that it extends beyond the end of the screw-threaded portion of the housing and receives the extension 46 of the body 45, thus providing a coupling which secures the adapter to the housing of the tool. The adapter has an external diameter such that the adapter fits loosely in the work piece hole to be operated on by the tool blades, and is provided with longitudinally-extending, angularly spaced-apart slots 47 which register with the blade-receiving grooves in the core 20, so that blades mounted in the core grooves may extend through these slots in the adapter.

When the adapter is used, the width of the blade is accordingly extended to provide a blade 48 of somewhat the shape illustrated in Figure 9. This blade 48 is the same as that illustrated in Figure 8 and described above, except that the width of an intermediate portion of the blade having a length substantially equal to the length of the adapter 45 less the length of the housing band 39 is extended to bring the cutting edge of the blade to the outer surface of the adapter.

A set of adapters of different external diameters and corresponding sets of blades of corresponding widths may be provided to adapt the tool for use in work piece holes or bores in several different dimensional ranges.

As explained above, the outer edges of the blades may be shaped and ground to provide any desired shape of the wall of a work piece hole or bore operated on by the tool.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims, are, therefore, intended to be embraced therein.

What is claimed is:

1. An internal grooving and reaming tool comprising an elongated, generally cylindrical core having external screw threads adjacent one end and longitudinally-extending, elongated grooves adjacent its opposite end, said grooves being spaced at substantially equal angular intervals around said core and having their bottom surfaces outwardly inclined in a direction away from said opposite end of said core, respective bushings surrounding said core at the opposite ends of said grooves and having internally chamfered adjacent ends, an externally screw-threaded, cylindrical housing receiving said core and having longitudinally-extending slots therein registering with the grooves in said core, a first compression spring surrounding the screw-threaded portion of said core and bearing at one end on the bushing disposed at the inner ends of said core grooves, the bushing at the outer ends of said grooves being fixed in the corresponding end of said housing, abutment means on said housing bearing upon the opposite end of said spring, a second compression spring surrounding the screw-threaded portion of said core and bearing upon said abutment means, an abutment threaded onto said core and bearing upon the opposite end of said second spring, respective elongated, flat blades disposed in said core grooves and having beveled ends engaged by the chamfered ends of said bushings to retain said blades in operative assembly with said core, each of said blades being tapered in thickness inwardly of said core so that the blades will be forced radially outwardly of said core when said housing is moved relative to said core in a direction away from said outer ends of the core grooves, a cylindrical sleeve receiving said housing, an anti-friction thrust bearing on the end of said sleeve nearest the outer ends of said core grooves, and a nut threaded onto said housing and bearing against the opposite end of said sleeve to control the depth of operation of said tool in a work piece hole or bore.

2. An expansible, rotatable cutting tool comprising an elongated core having grooves spaced apart at substantially equal angular intervals therearound and extending from one end thereof and recesses extending longitudinally from said one end respectively adjacent said grooves, each of said grooves having its bottom surface inclined outwardly of said core in a direction away from said one end of the latter, elongated cutting blades received respectively in said grooves, each of said blades having oppositely beveled ends and being tapered in thickness from one end to the other and having its thicker end disposed adjacent said one end of said core, an internally-chamfered bushing surrounding said core and engaging said blades at the thinner ends of the latter, a hollow cylindrical housing slidably receiving said core and said bushing and including a portion of reduced external diameter of a length less than the length of said core grooves, said housing having in said reduced portion angularly spaced-apart, longitudinally-extending slots registering with the grooves and recesses in said core and external screw threads on the larger portion thereof, an internally-chamfered bushing secured in the outer end of the reduced portion of said housing and engaging said blades at the thicker ends of the latter, said blades being movable radially outwardly of said core when said housing is moved relative to said core away from said one end of the latter, spring means connected between said core and said housing resiliently urging said housing toward said one end of said core, and an annular tool stop surrounding and adjustably positioned relative to said housing to determine the depth of operation of said tool in a work piece, said core having at its end opposite said one end a non-circular shank engageable by a drill chuck to rotate said tool and move said core longitudinally of said housing against the force of said spring means.

3. An expansible, rotatable cutting tool comprising an elongated core having grooves spaced apart at substantially equal angular intervals therearound and extending longitudinally from one end thereof, respectively elongated cutting blades mounted in said grooves, a hollow cylindrical housing receiving said core and having a portion of reduced external diameter provided with longitudinally-extending slots respectively receiving said blades, a bushing secured in the outer end of said reduced portion of said housing engaging the adjacent ends of said blades, a bushing surrounding said core within said housing engaging the opposite ends of said blades, a compression spring between said last-mentioned bushing and the end of said housing opposite said first-mentioned bushing, an abutment on said core spaced from said opposite end of said housing, a compression spring between said abutment and said opposite end of said housing, and a depth-stop surrounding said housing and adjustably positioned relative thereto, said core and said blade having cooperating inclined surfaces for forcing said blades outwardly of said core upon relative movement of said core and said housing in a direction to compress said last-mentioned compression spring.

4. An expansible, rotatable cutting tool comprising an elongated core having grooves spaced apart at substantially equal angular intervals therearound and extending longitudinally from one end thereof, respective elongated cutting blades mounted in said grooves, a hollow cylindrical housing receiving said core and having a portion of reduced external diameter provided with longitudinally-extending slots respectively receiving said blades, a bushing secured in the outer end of the reduced portion of said housing engaging the adjacent ends of said blades, a bushing surrounding said core within said housing engaging the opposite ends of said blades, a compression spring between said last-mentioned bushing and the end of said housing opposite said first-mentioned bushing, an abutment on said core spaced from said opposite end of said housing, a compression spring between said abutment and said opposite end of said housing, a depth-stop surrounding said housing and adjustably positioned relative thereto, said core and said blades having cooperating inclined surfaces for forcing said blades outwardly of said core upon relative movement of said core and said housing in a direction to compress said last-mentioned compression spring, and a hollow, cylindrical adapter receiving said housing portion of reduced diameter.

5. An expansible, rotatable cutting tool comprising an elongated core having grooves spaced apart at substantially equal angular intervals therearound and extending longitudinally from one end thereof, respectively elongated cutting blades mounted in said grooves, a hollow cylindrical housing receiving said core and having a portion of reduced external diameter provided with longitudinally-extending slots respectively receiving said blades, a bushing secured in the outer end of the reduced portion of said housing engaging the adjacent ends of said blades, a bushing surrounding said core within said housing engaging the opposite ends of said blades, a compression spring between said last-mentioned bushing and the end of said housing opposite said first-mentioned bushing, an abutment on said core spaced from said opposite end of said housing, a compression spring between said abutment and said opposite end of said housing, said core and said blades having cooperating inclined surfaces for forcing said blades outwardly of said core upon relative movement of said core and said housing in a direction to compress said last-mentioned compression spring, a hollow, cylindrical adapter receiving said housing portion of reduced diameter and having blade-receiving slots therein and a screw-threaded extension abutting the portion of said housing at the inner end of said reduced housing portion, and said housing having external screw threads thereon, an internally screw-threaded sleeve receiving said housing and said adapter extension to secure said adapter to said housing, and an anti-friction thrust bearing carried by said sleeve to provide a depth-stop for said tool.

BURL B. BOWREN.

REFERENCES CITED

The following references are of record in the file of this patent:

UNITED STATES PATENTS

| Number | Name | Date |
|---|---|---|
| 1,946,753 | Moberley | Feb. 13, 1934 |
| 2,333,935 | Jones | Nov. 9, 1943 |
| 2,457,269 | Pfrehm | Dec. 28, 1948 |